INVENTOR
Rudolf E. Hellmund.

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,231,604.

Specification of Letters Patent.

Patented July 3, 1917.

Application filed May 3, 1916. Serial No. 95,022.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control for dynamo-electric machines and especially to the regenerative control of electric railway motors and the like, under predetermined conditions.

One object of my invention is to provide a system of the above-indicated character which shall be relatively simple and inexpensive in construction and effective and reliable in operation and which shall embody novel means, comprising an auxiliary source of energy, for exciting the driving motor of a motor-generator set that is employed for main-field-winding excitation purposes under regenerative conditions, whereby "flash-over" troubles in the driving motor are effectively prevented.

In a specific aspect, it is an object of my invention to provide an auxiliary motor-generator set to be driven from the supply circuit and adapted to excite the main machine field windings during the regenerative period, the motor-generator set being provided with an arrangement of field windings whereby the excitation of the driving motor thereof is automatically increased to a predetermined value upon an interruption of voltage to the driving motor, as hereinafter more fully set forth.

Figure 1:
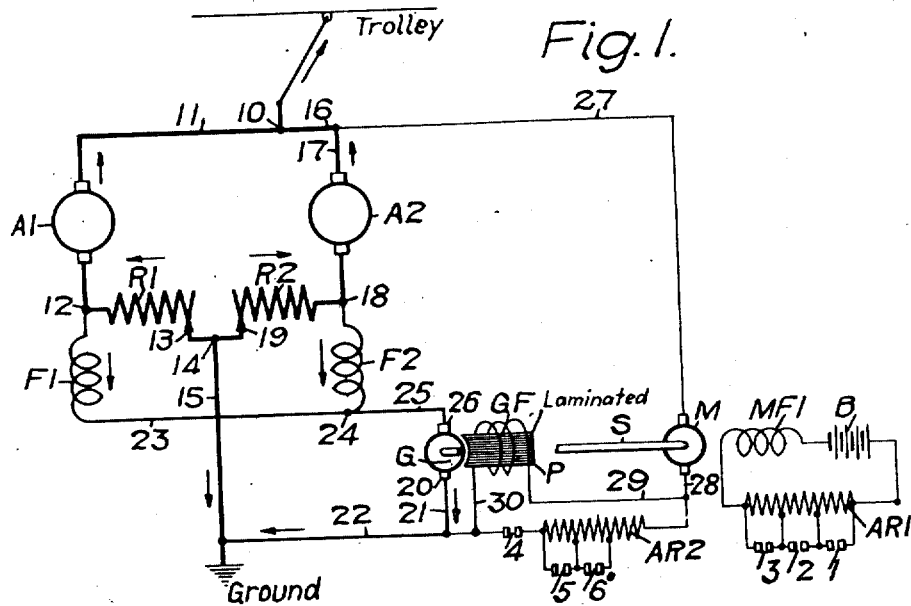
Figure 2:
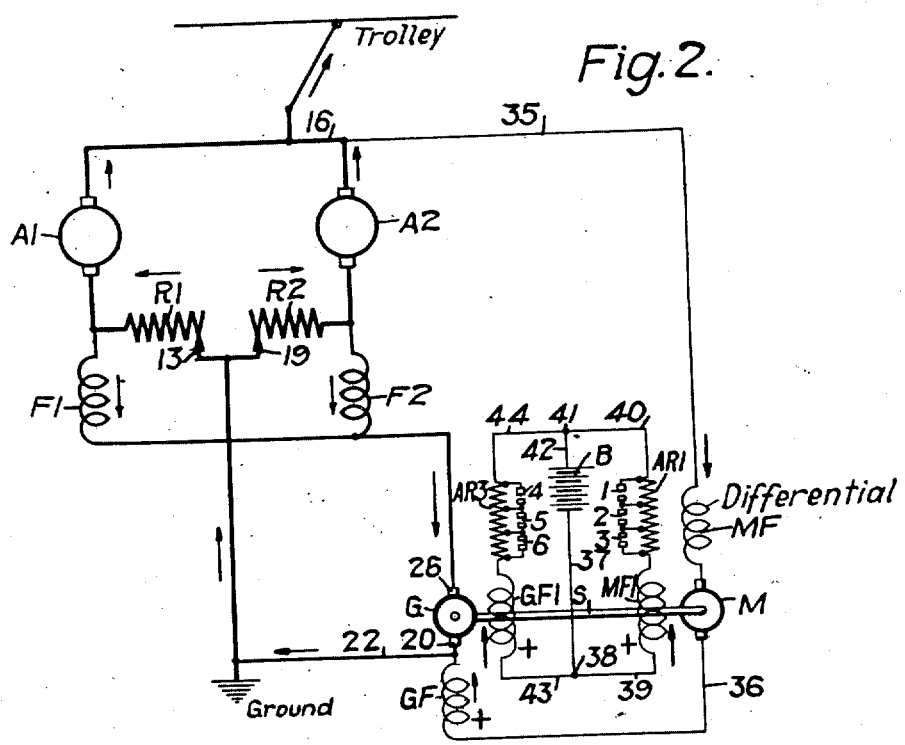

My invention may best be understood by reference to the accompanying drawing, wherein Figure 1 is a diagrammatic view of a system of control embodying my present invention, and Fig. 2 is a similar view of a modification of the invention.

Referring to Fig. 1 of the drawing, the system shown comprises a plurality of suitably supply-circuit conductors respectively marked "Trolley" and "Ground," a plurality of main dynamo-electric machines respectively having armatures A1 and A2 and field-magnet windings F1 and F2 of the series type; a plurality of main-circuit resistors R1 and R2 that are associated with the main armatures in a manner to be described; a motor-generator set comprising a driving armature winding M, an exciting armature winding G, a field winding GF for the armature G that is connected in series relation with the driving armature M, and a field winding MF1 for the armature M that is independently excited by a suitable auxiliary source of energy, such as a storage battery B.

The armature windings M and G of the auxiliary motor-generator set may be mechanically connected in any suitable manner, as by a shaft s, and the motor armature winding and the generator armature winding are respectively adapted to be driven from the supply circuit and to excite the main field windings F1 and F2, as set forth in detail later. The series field winding GF for the armature winding G is disposed upon a plurality of polar projections, here represented by the single rectangle P, which are preferably composed of laminated magnetizable material in order to produce a relatively highly inductive effect, for a purpose to be described. An auxiliary resistor AR2 is adapted to be connected in shunt relation to the field winding GF upon the closure of a switch 4, and the resistor may be varied in active circuit value by suitably manipulating a plurality of switches 5 and 6, whereby the effective exciting action of the series field winding GF may be regulated.

The field winding MF1 of the driving armature M is connected in series relation with a variable resistor AR1 across the battery B, and the resistor may be regulated in value through the agency of a plurality of suitable switches 1, 2 and 3, thus determining the excitation of the armature winding M.

Inasmuch as my present invention pertains only indirectly to the type of regenerative control system that is employed, I have not deemed it necessary to fully illustrate and describe means for connecting the various machines in the manner shown or means for inaugurating the regenerative operation of the main machines. The main-circuit connections that are here shown for illustrative purposes only, are fully set forth and claimed in my co-pending application, Serial No. 44,443, filed August 9, 1915.

Assuming that regenerative operation of the main momentum-driven machines has been started in any suitable manner and that the connections of the various machines are as illustrated in Fig. 1, such connections may be traced as follows: One main circuit is established from the trolley through junction-point 10, conductor 11, main armature A1, junction-point 12, main-circuit resistor R1, a switching device 13, here conventionally shown as an arrowhead, junction-point 14 and conductor 15 to the negative conductor Ground.

A second similar main circuit is established from the junction-point 10 through conductors 16 and 17, main armature A2, junction-point 18, main-circuit resistor R2, switching device 19, which corresponds to the other switching device 13, and thence through junction-point 14, as just recited.

One terminal 20 of the exciting armature G of the motor-generator set is connected through conductors 21 and 22 to conductor 15 and junction-point 14, where the circuit divides, one branch including switching device 13, main-circuit resistor R1, junction-point 12, main field winding F1 and conductor 23 to junction-point 24, and the other branch including switching device 19 and main-circuit resistor R2, junction-point 18, main field winding F2 and the junction-point 24, whence circuit is completed through conductor 25 to the other terminal 26 of the exciting armature winding G.

An auxiliary circuit is completed from the conductor 16 through conductor 27, the driving armature winding M of the motor-generator set, conductors 28 and 29, the series field winding GF for the armature winding G and conductors 30 and 22 to the negative conductor Ground. The auxiliary resistor AR2, when the switch 4 is closed, is connected between conductors 28 and 30, and is thus connected in direct parallel relation to the series field winding GF.

The operation of the above-described system may be set forth in general as follows: Upon an incipient increase of regenerated current in the main armature A1, for example, a correspondingly increased voltage drop across the main-circuit resistor R1 obtains, whereby the voltage available for delivery to the main field winding F1 from the approximately constant-voltage exciting armature G is accordingly reduced and, by reason of such negative compounding effect, the current traversing the main armature A1 is inherently and immediately reduced to the normal value. The regulating action just outlined is fully set forth in my above-identified co-pending application, but it is believed that the foregoing brief description will be sufficient for the purposes of the present specification. It will be understood that, in case of an incipient decrease of regenerated current in either main armature, the converse action of automatically strengthening the corresponding field excitation, will take place.

However, under the above-mentioned circumstances of an incipient increase of regenerated current in the armature A1, a further effect is produced, in that the decreased exciting current that is necessarily delivered by the auxiliary armature winding G under such conditions, causes a corresponding reduction in the load of the motor-generator set, that is to say, in the current that traverses the driving armature winding M and the series field winding GF for the armature G. Consequently, in addition to the previously described negative compounding effect of the main machines, the exciting armature winding G is provided with a positive compounding characteristic and, in the assumed case, the field flux that is produced by the series field winding GF is reduced to effect a corresponding decrease in the generated voltage of the armature winding G and thus aid in the desired automatic maintenance of substantially constant regenerated current. It will be understood that the two inherent regulating actions that have just been described occur at a relatively rapid rate, and the actual fluctuations of regenerated current in either main armature are maintained within desirably narrow limits.

To maintain the desired value of the regenerated current as the speed of the momentum-driven machines decreases, the switching devices 13 and 19 may be suitably manipulated, preferably automatically in accordance with regenerated current, as set forth in my above-identified co-pending application, to gradually vary the active circuit value of the resistors R1 and R2 and thus compensate for the speed reduction in question. Further regulation of the regenerative operation may be effected at any time by suitable manipulation of the switches 1 to 6, inclusive, to again accomplish an increase of the main field-winding excitation as the speed of the momentum-driven vehicle decreases.

One of the principal advantages of the above-described system resides in its inherent ability to prevent "flash-over" conditions in the driving armature M, under abnormal conditions, such as the sudden resumption of supply-circuit voltage after a temporary interruption thereof, caused by the vehicle current-collecting device temporarily leaving the supply-circuit conductor, for instance.

Upon the resumption of supply-circuit voltage, the current traversing the driving armature M tends to rapidly increase to a relatively high value by reason of the comparatively low inductance of the armature winding, whereas, in motor-generator sets embodying a supply-circuit-excited field-magnet winding, particularly of the shunt type, such as has been more or less customary in the prior art, the relatively high inductive effect of the field-winding circuit has prevented a building up of the field flux as rapidly as the simultaneous armature current flux, whereby an undue distortion of the field flux, with resultant relatively high voltage between commutator bars and liability to "flash-over" troubles has occurred in many cases in the past.

In my invention, however, the utilization of the field winding MF1, which is excited from the independent auxiliary source B, maintains a substantially constant field flux for the driving armature winding M and thus, upon a resumption of supply-circuit voltage after a temporary interruption thereof, the armature current does not increase to such a value that the field flux is unduly distorted, or, in other words, the maintenance of a desirably strong field excitation during the above-mentioned emergency conditions effectively precludes the possibility of "flash-over" troubles in the driving motor armature winding M. Moreover, the abnormal increase of current in the armature winding M, in the circumstances under consideration, is checked by reason of the highly inductive effect of the series field winding GF which is wound upon the laminated polar projections P and is connected in series relation with the driving armature winding M. The well-known choke-coil action of the field winding GF thus prevents the traversal of an unduly high current through the circuit of the driving armature winding.

Reference may now be had to Fig. 2 which is like Fig. 1 as regards the main-machine circuits and the connections of the generator or exciting armature winding G. The novel features of the system shown in Fig. 2 reside in the relative arrangement of the field windings for the auxiliary armatures M and G, as about to be described. The motor-generator set, in addition to the auxiliary armature windings M and G, is provided with field windings MF and MF1 for the armature winding M, and field windings GF and GF1 for the other armature winding G. The battery B is employed for exciting the field windings MF1 and GF1 through a plurality of variable resistors AR1 and AR3, respectively.

One auxiliary circuit is completed from the conductor 16 through conductor 35, series field winding MF, driving armature winding M, conductor 36, series field winding GF of the armature winding G and conductor 22 to the negative conductor Ground. An independent auxiliary circuit is established from one terminal of the battery B through conductor 37, junction-point 38, where the circuit divides, one branch including conductor 39, field winding MF1 of the armature winding M, variable resistor AR1, and conductor 40 to a second junction-point 41, and the other branch including conductor 43, field winding GF1 of the armature winding G, variable resistor AR3 and conductor 44 to the junction-point 41, whence circuit is completed through conductor 42 to the other terminal of the battery B.

As indicated by the positive signs, the series field winding GF and shunt field winding GF1 for the armature winding G are adapted to produce a cumulative exciting effect in that both field windings act to increase the delivered voltage of the armature winding. The shunt field winding MF1 for the driving armature M performs a similar function, but, as indicated by the negative sign and the legend "Differential," the series field winding MF tends to oppose the positively energizing action of the shunt field winding MF1, or, in other words, the two field windings MF and MF1 are differentially related with respect to each other, and the effective flux that threads the driving armature M corresponds to the difference of the fluxes that are produced by the two field windings.

The normal operation of the system shown in Fig. 2 is very similar to that set forth in connection with Fig. 1, but a different action takes place under the above-mentioned emergency conditions, namely, the sudden resumption of supply-circuit voltage after a temporary interruption thereof. Under such circumstances, the opposing action of the series field winding MF disappears, while the full positively energizing effect of the shunt field winding MF1 acts upon the driving armature M. By suitable design of parts, therefore, the driving armature M may be provided with a greater field excitation during the above-mentioned interruption of supply-circuit voltage than it has under normal operating conditions when the opposing action of the series field winding MF takes effect. It should be noted that, even though the interruption of supply-circuit voltage is of sufficient duration to permit of a certain reduction in speed of the motor-generator set, the increased field excitation provided by the independently excited shunt field winding MF1 will be sufficient to prevent the previously described undesirable predominance of restored armature current flux over the simultaneous field winding flux, whereby "flash-over" conditions will be effectively prevented.

It will be understood that regulation to offset the effect of decreasing vehicle speed is accomplished in a manner similar to that set forth in connection with Fig. 1, namely, gradual exclusion from circuit of the main resistors R1 and R2 by the switching devices 13 and 19, and manipulation of the switches 1 to 6, inclusive, to gradually speed up the motor-generator set and increase the excitation of the armature winding G, to thus gradually increase the current traversing the main field windings.

I do not wish to be restricted to the specific circuit connections or location and arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a main dynamo-electric machine having an armature and a field winding, of a plurality of mechanically-connected armature windings respectively driven from said supply circuit and connected to excite said field winding, and means other than said supply circuit for providing excitation for one of said armature windings.

2. In a system of control, the combination with a supply circuit and a main dynamo-electric machine having an armature and a field winding, of a plurality of mechanically-connected armature windings one of which is connected to excite said main field winding, auxiliary field windings for said armature windings and means for exciting one of said auxiliary field windings independently of said supply circuit.

3. In a system of control, the combination with a supply circuit and a main dynamo-electric machine having an armature and a field winding, of a plurality of mechanically-connected armature windings for respectively exciting said field winding and driving said armature windings, auxiliary field windings therefor, and means independent of said supply circuit for providing excitation for said driving armature winding.

4. In a system of control, the combination with a supply circuit and a main dynamo-electric machine having an armature and a field winding, of a plurality of mechanically-connected armature windings respectively driven from said supply circuit and connected to excite said field winding, auxiliary field windings for said armature windings, and means independent of said supply circuit for exciting the auxiliary field winding corresponding to the driving armature winding.

5. In a system of control, the combination with a supply circuit and a main dynamo-electric machine having an armature and a field winding, of a plurailty of mechanically-connected armature windings respectively driven from said supply circuit and connected to excite said field winding, an auxiliary source of energy independent of said supply circuit, and auxiliary field windings for said armature windings respectively excited from said source and said supply circuit.

6. In a system of control, the combination with a supply circuit and a main dynamo-electric machine having an armature and a field winding, of a plurality of mechanically-connected armature windings respectively driven from said supply-circuit and connected to excite said field winding, an auxiliary source of energy, an auxiliary field winding for the driving armature winding energized from said source, and a relatively highly inductive field winding for the exciting armature winding connected in series relation with the driving armature winding.

7. In a system of control, the combination with a supply circuit and a main dynamo-electric machine having an armature and a field winding, of a plurality of mechanically-connected armature windings respectively driven from said supply circuit and connected to excite said field winding, an auxiliary source of energy, and auxiliary field windings for said armature windings energized from said source.

8. In a system of control, the combination with a supply circuit and a main dynamo-electric machine having an armature and a field winding, of a plurality of mechanically-connected armature windings respectively driven from said supply circuit and connected to excite said field winding, an auxiliary source of energy, and a pair of field windings for each of said armature windings respectively energized from said source and said supply circuit.

9. In a system of control, the combination with a supply circuit and a main dynamo-electric machine having an armature and a field winding, of a plurality of mechanically-connected armature windings respectively driven from said supply circuit and connected to excite said field winding, an auxiliary source of energy, and a pair of field windings for each of said armature windings respectively energized from said source and said supply circuit, one of said pairs of field windings being cumulatively, and the other pair being differentially, related.

10. In a system of control, the combination with a supply circuit and a main dynamo-electric machine having an armature and a field winding, of a plurality of mechanically-connected armature windings respectively driven from said supply circuit and connected to excite said field winding, an auxiliary source of energy, auxiliary field windings for said armature windings energized from said source, and additional field windings connected in series relation with the driving armature winding and respectively adapted to produce a differential and a cumulative effect with respect to the source-excited field windings of the driving and the exciting armature.

11. In a system of control, the combination with a supply circuit and a main dynamo-electric machine having an armature and a field winding, of a plurality of mechanically-connected armature windings respectively driven from said supply circuit and connected to excite said field winding, and a set of field windings for the driving armature arranged to automatically produce an increased exciting flux upon an interruption of voltage to the driving armature.

12. In a system of control, the combination with a supply circuit and a main dynamo-electric machine having an armature and a field winding, of a plurality of mechanically-connected armature windings respectively driven from said supply circuit and connected to excite said field winding, an auxiliary source of energy, and a pair of differentially-related field windings for the driving armature respectively energized from said source and said supply circuit in such manner that an increased exciting flux threads the driving armature upon an interruption of voltage thereto.

In testimony whereof, I have hereunto subscribed my name this 26th day of April 1916.

RUDOLF E. HELLMUND.